United States Patent
Schmidl et al.

(10) Patent No.: US 8,054,810 B2
(45) Date of Patent: Nov. 8, 2011

(54) INTERLEAVER FOR TRANSMIT DIVERSITY

(75) Inventors: Timothy M. Schmidl, Dallas, TX (US); Anand G. Dabak, Plano, TX (US); Eko N. Onggosanusi, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 967 days.

(21) Appl. No.: 10/179,592

(22) Filed: Jun. 25, 2002

(65) Prior Publication Data

US 2003/0012171 A1    Jan. 16, 2003

Related U.S. Application Data

(60) Provisional application No. 60/300,690, filed on Jun. 25, 2001, provisional application No. 60/331,617, filed on Nov. 20, 2001.

(51) Int. Cl.
*H04J 13/00* (2011.01)

(52) U.S. Cl. ......... 370/335; 370/342; 370/441; 370/479

(58) Field of Classification Search ........ 375/267, 375/260, 259, 295, 377; 341/81, 50; 370/334, 370/341, 441, 479, 335, 342
See application file for complete search history.

(56) References Cited

U.S. PATENT DOCUMENTS

| | | | | |
|---|---|---|---|---|
| 4,766,560 | A * | 8/1988 | Curry et al. ................. | 708/276 |
| 5,204,874 | A * | 4/1993 | Falconer et al. ............ | 375/130 |
| 6,466,564 | B1 * | 10/2002 | Rakib et al. ................. | 370/342 |
| 6,539,209 | B1 * | 3/2003 | Dajer et al. ................. | 455/101 |
| 6,553,516 | B1 * | 4/2003 | Suda et al. .................. | 714/702 |
| 6,631,491 | B1 * | 10/2003 | Shibutani et al. ........... | 714/762 |
| 6,687,233 | B1 * | 2/2004 | Chen et al. .................. | 370/253 |
| 6,993,085 | B2 * | 1/2006 | Le Dantec .................. | 375/295 |
| 7,028,230 | B2 * | 4/2006 | Manninen et al. .......... | 714/702 |
| 7,068,701 | B2 * | 6/2006 | Agami et al. ............... | 375/130 |
| 7,154,958 | B2 * | 12/2006 | Dabak et al. ................ | 375/267 |
| 7,233,810 | B2 * | 6/2007 | Medlock et al. ............ | 455/560 |

* cited by examiner

*Primary Examiner* — Hassan Phillips
*Assistant Examiner* — Duc Duong
(74) *Attorney, Agent, or Firm* — Ronald O. Neerings; Wade James Brady, III; Frederick J. Telecky, Jr.

(57) ABSTRACT

The present invention exploits the benefits obtainable from using transmit diversity by designing the size of the interleaver matrix to avoid the case where most or all of the bits in a row are transmitted on a single antenna (110 or 112). This can be accomplished, for example, by specifying the interleaver matrix based on the type of modulation (308) used. A symbol scrambler can also be used to exploit the benefits obtainable from using transmit diversity.

36 Claims, 4 Drawing Sheets

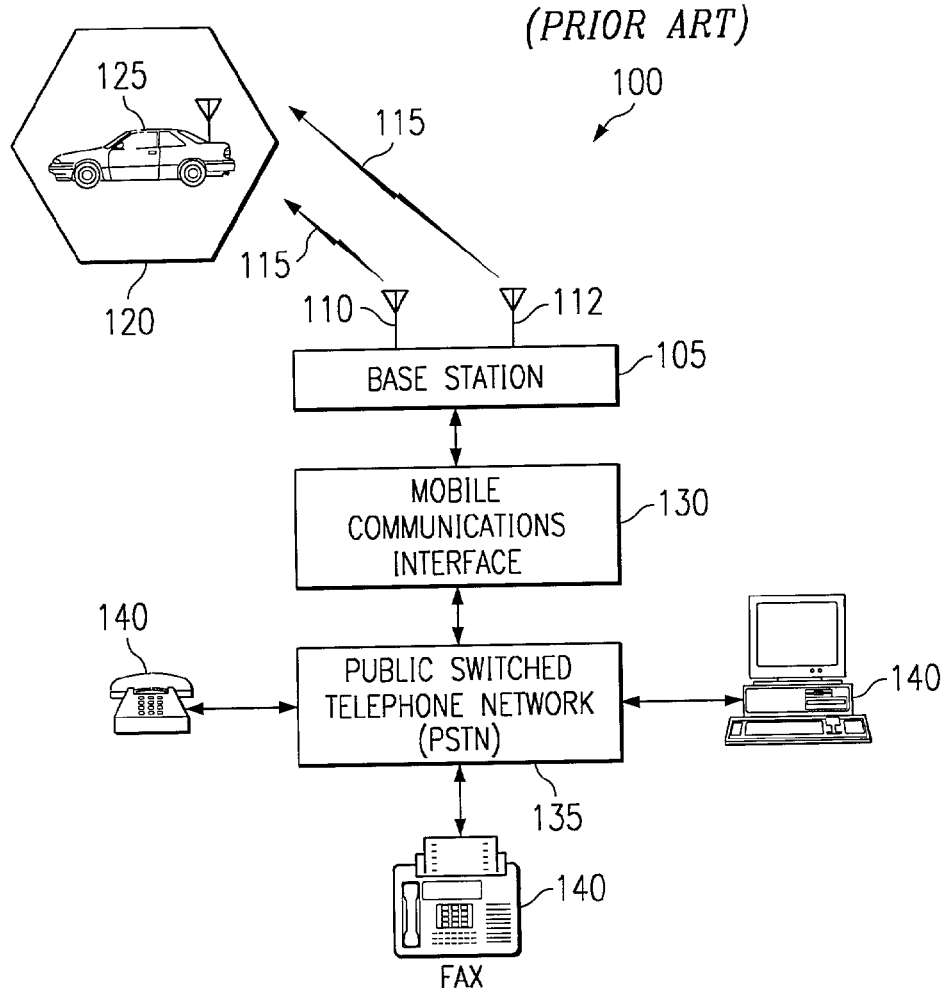

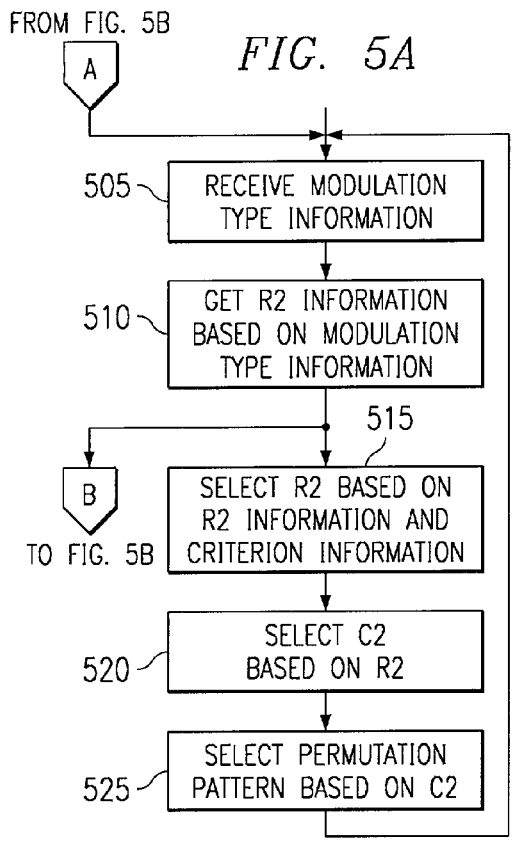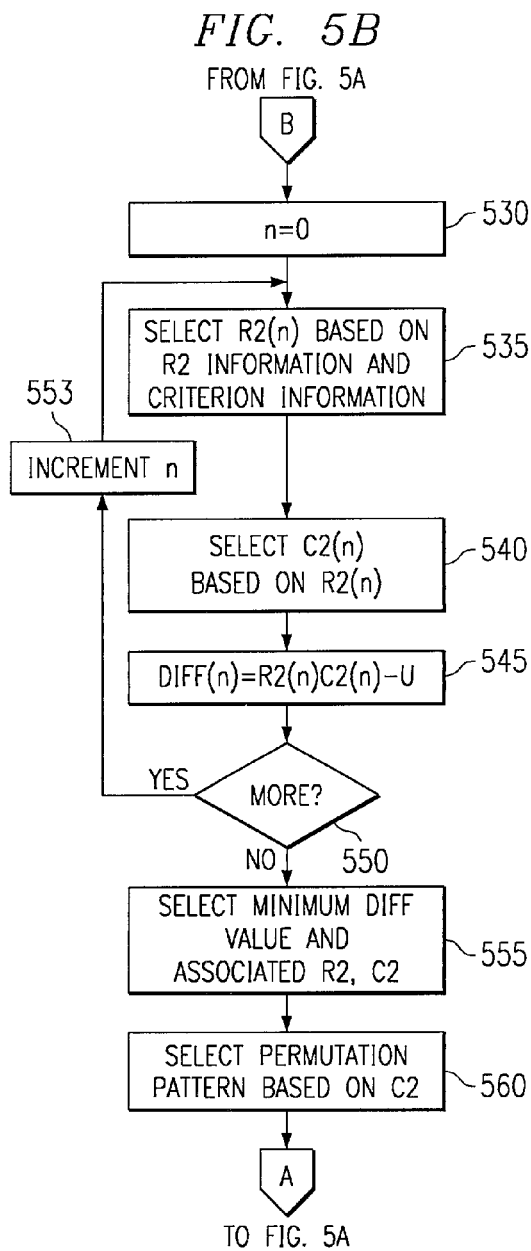

INTERLEAVER FOR TRANSMIT DIVERSITY

This application claims the priority under 35 U.S.C. §119 (e)(1) of U.S. provisional application No. 60/300,690 filed on Jun. 25, 2001 and U.S. provisional application No. 60/331, 617 filed on Nov. 20, 2001. The aforementioned patent applications are incorporated herein by reference.

FIELD OF THE INVENTION

The invention relates generally to wireless telecommunications and, more particularly, to an interleaver for transmit diversity.

BACKGROUND OF THE INVENTION

In mobile communications systems, signal performance may be reduced due to signal fading occurring as a result of physical interference and/or motion of the mobile terminal. Fading can be reduced by a number of methods, such as increasing transmitter power and/or antenna size and height. However, a more cost effective method is to implement transmit diversity at the base station, in systems such as wideband code division multiple access ("WCDMA") and CDMA-2000, in order to improve link quality. Transmit diversity provides an advantage in the forward link by balancing the spectrum efficiency in the uplink and downlink.

Several transmit diversity techniques are known in the art. Among these are orthogonal transmit diversity ("OTD") and time-switched transmit diversity ("TSTD"). OTD is a technique in which a data stream is split into two (2) separate streams that are then transmitted on two (2) transmit antennae at the same time by employing different Walsh codes. TSTD is a technique in which symbols of a data stream are alternately transmitted from two (2) transmit antennae. One problem with OTD and TSTD is that full diversity is not achieved if the interleaver is not well-designed. For example, if a data stream is convolutionally encoded and many consecutive bits are transmitted from the same antenna, then there is not much gain over simply using a single transmit antenna.

It is therefore desirable to provide a solution that adequately exploits the benefits obtainable from using transmit diversity. The present invention provides this by designing the size of the interleaver matrix to avoid the case where most or all of the bits in a row are transmitted on a single antenna. This can be accomplished, for example, by specifying the interleaver matrix such that the number of rows is an odd multiple of the number of bits/symbol or such that the number of rows is determined by the type of modulation.

BRIEF DESCRIPTION OF THE DRAWINGS

The above and further advantages of the invention may be better understood by referring to the following description in conjunction with the accompanying drawings in which corresponding numerals in the different figures refer to the corresponding parts, in which:

FIG. 1 diagrammatically illustrates a conventional communication system as known in the art;

FIG. 2 illustrates a conventional block interleaver input bit matrix as known in the art;

FIG. 5A is a flow chart in accordance with an exemplary embodiment of the present invention;

FIG. 5B is a flow chart in accordance with an exemplary embodiment of the present invention.

DETAILED DESCRIPTION

Figure 3A:
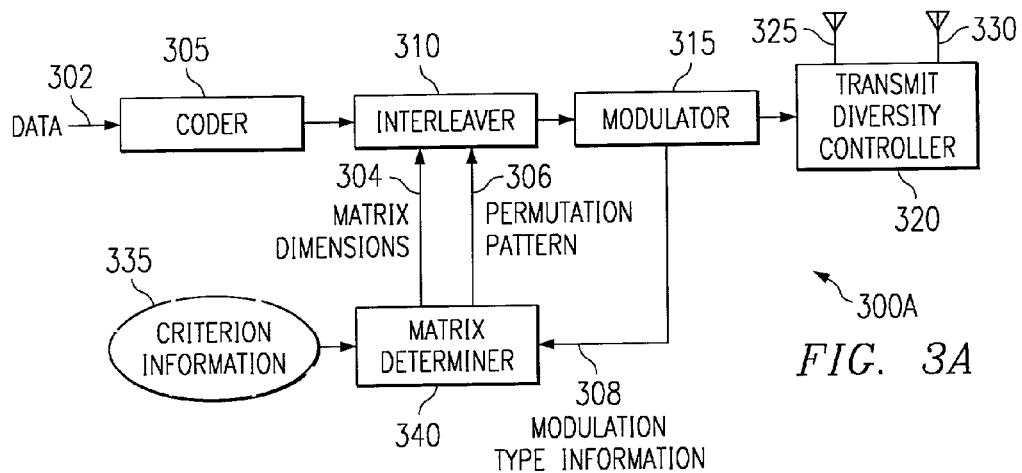
FIG. 3A diagrammatically illustrates a transmitter in accordance with an exemplary embodiment of the present invention.

While the making and using of various embodiments of the present invention are discussed herein in terms of specific types of transmit diversity and modulation techniques, it should be appreciated that the present invention provides many inventive concepts that can be embodied in a wide variety of contexts. The specific embodiments discussed herein are merely illustrative of specific ways to make and use the invention, and are not meant to limit the scope of the invention.

The present invention exploits the benefits obtainable from using transmit diversity by designing the size of the interleaver matrix to avoid the case where most or all of the bits in a row are transmitted on a single antenna. This can be accomplished, for example, by specifying the interleaver matrix such that the number of rows is an odd multiple of the number of bits/symbol or such that the number of rows is determined by the type of modulation.

Turning now to FIG. 1 which diagrammatically illustrates a conventional communication system 100, such as a wideband code division multiple access ("WCDMA") or a CDMA communications system, as known in the art. Base station 105 has at least two (2) antennae 110 and 112 which support transmit diversity. Antennae 110 and 112 are capable of covering a single sector 120, thereby enabling base station 105 to engage in communications 115 with mobile station 125 while within sector 120. Mobile station 125 is depicted as an automobile with an antenna; however, mobile station 125 may be any mobile device, such as a phone or a personal digital assistant ("PDA") capable of receiving and/or sending communications 115 within communication system 100. For simplicity, communication system 100 is shown with a single base station 105, a single mobile station 125, and a single sector 120. A typical communication system 100 can include multiple base stations 105, multiple mobile stations 125 and multiple sectors 120. Mobile communications interface 130 is coupled to base station 105. Interface 130 performs controller and switching functions related to communication system 100. Coupled to interface 130 is public switched telephone network ("PSTN") 135 which provides connectivity to landline units 140. Landline units 140 are capable of originating and/or receiving communications to/from mobile station 125 within communication system 100. Mobile station 125 may also communicate with other mobile stations 125 through communication system 100.

A communication system, such as communication system 100, implementing transmit diversity such as orthogonal transmit diversity ("OTD"), transmits encoded data symbols of an information data symbol from at least two (2) transmit antennae, such as 110 and 112, such that one encoded symbol is transmitted from one antenna, such as antenna 110, and another encoded symbol is transmitted from another antenna, such as antenna 112. The encoded symbols transmitted from antenna 110 are spread using a conventional orthogonal Walsh code different than the conventional Walsh code used for the encoded symbols transmitted from antenna 112. Mobile station 125 receives both signals (communications 115) and obtains a reception diversity improvement because the decoder present in mobile station 125 processes a group of symbols that have faded independently.

The current interleaver used in a communication system, such as a WCDMA system, is a block interleaver which consists of bits input to a matrix with padding, an inter-column permutation of the matrix, and bits output from the matrix with pruning. In FIG. 2, which illustrates a conventional block interleaver input bit matrix, bits to be input to the interleaver are represented by $b_1, b_2, \ldots b_U$, the number of columns is represented by C2, and the number of rows in the matrix is represented by R2. An exemplary number of columns C2 would be 30. R2 is found by determining the minimum integer R2 such that $U<=(R2)(C2)$. If $U<(R2)(C2)$, then dummy bits are inserted to fill the input bit matrix (conventional padding) and later pruned away. The dummy bits act as placeholders and are not transmitted.

After the matrix has been filled, a conventional inter-column permutation is performed. An exemplary inter-column permutation pattern for C2=30 would be: 0, 20, 10, 5, 15, 25, 3, 13, 23, 8, 18, 28, 1, 11, 21, 6, 16, 26, 4, 14, 24, 9, 9, 12, 2, 7, 22, 27, 17. In this pattern, the columns are numbered from 0 to 29 and the numbers in the pattern are the original column positions. Therefore, matrix column 0 remains in position 0, while matrix column 20 is placed in position 1, and so on. The final step is to read out the bits, column by column, while deleting (pruning) the placeholder dummy bits. The resultant number of bits read out of the interleaver matrix is the same size as the input, which is U bits.

A poorly designed interleaver hinders the level of diversity achievable from transmit diversity techniques, such as OTD and time-switched transmit diversity ("TSTD"). For example, assume that quadrature phase shift keying ("QPSK") modulation is used. A conventional block interleaver, as described above with reference to FIG. 2, used in conjunction with convolutional encoding and QPSK modulation, would result in many consecutive bits being transmitted from a single transmit antenna. With reference also to FIG. 1, when the interleaver output is read from a matrix constructed using the current block interleaver, two (2) bits will be read to form the QPSK symbol to be transmitted on a first antenna, such as antenna 110. Then, the next two (2) bits will be transmitted on a second antenna, such as antenna 112. This pattern repeats, alternating between antenna 110 and antenna 112, every two (2) bits. If the number of rows, R2 (FIG. 2), is an even number times the number of bits/symbol, then the first two (2) rows of bits in FIG. 2 would all be transmitted on antenna 110 of FIG. 1, and the next two (2) rows of bits in FIG. 2 would all be transmitted on antenna 112 of FIG. 1. This is particularly troublesome if the bits in the rows have been generated by a convolutional encoder. When C2=30, for example, then sixty (60) consecutive bits from the convolutional encoder would all be transmitted on the same antenna, thereby diminishing the diversity gains that could be achieved with OTD or TSTD.

Exemplary embodiments of the invention set the number of rows, R2, equal to an odd number times the number of bits/symbol. In this case, half of the bits on each row of FIG. 2 will be transmitted on a first antenna, such as antenna 110 of FIG. 1, and the other half will be transmitted on a second antenna, such as antenna 112 of FIG. 1. This increases the diversity benefit achievable with conventional OTD or TSTD. To further maximize the diversity benefit, R2 can be chosen such that half the bits in each row are transmitted on each antenna 110 or 112 within the smallest possible number of columns (less than C2 of FIG. 2). This can be useful because the length of error events in convolutional codes can be much less than C2.

For example, when using QPSK modulation, as long as the number of rows, R2, is not an even multiple of the number of bits/symbol, then half the bits in each row will be transmitted on each antenna. Therefore, it is sufficient to ensure that R2 is not a multiple of 4. For a further improvement in diversity gains, R2 can be set to 4n+2 where n is an integer.

As another example, when using 8-PSK modulation, in order for half the bits in each row to be transmitted on each antenna, the number of rows, R2, mod 6 should be equal to 1, 3 or 5. If R2 mod 6 equals 2 or 4, then two-thirds (⅔) of the bits in each row will be transmitted on a first antenna and one-third (⅓) of the bits in each row will be transmitted on a second antenna. If R2 mod 6 equals 0, then all the bits in each row will be transmitted on a first antenna. Therefore, a reasonable improvement in diversity gains is achieved by setting R2 equal to an odd number. But, more improvement in diversity gains is achieved by setting R2 equal to 6n+3 where n is an integer.

For 16-QAM (quadrature amplitude modulation) modulation, as long as the number of rows, R2, is not divisible by 8, then approximately 15 or 16 bits out of 30 bits (for C2=30) in each row will be transmitted on a first antenna, with the remainder transmitted on a second antenna. Therefore, for 16-QAM modulation, improvement in diversity gains can be achieved by simply avoiding an R2 that is evenly divisible by 8. Further diversity gain improvement can be achieved by setting R2 equal to 8n+4 where n is an integer. For 64-QAM modulation, a number of rows which is a multiple of 12 leads to all the bits in a row being transmitted on a single antenna. Additionally, multiples of 4 which are not multiples of 12 will results in two-thirds (⅔) of the bits being transmitted on a first antenna, with the remaining one-third (⅓) being transmitted on a second antenna. Therefore, to achieve an improvement in diversity gains for 64-QAM modulation, R2 should not be evenly divisible by 4. For further improvements in diversity gains for 64-QAM modulation, R2 can be set to 12n+6 where n is an integer.

In general, dummy bits should be inserted so that the total number of bits per frame before interleaving is the number of rows times the number of columns (R2×C2). To avoid using an excessive number of dummy bits, R2 and C2 can be jointly chosen in some embodiments such that the number of dummy bits (R2×C2−U, where U is the original number of input bits) is minimized. Therefore, C2 and the permutation pattern are varied according to the modulation scheme in such embodiments.

FIG. 3A diagrammatically illustrates pertinent portions of a transmitter 300A in accordance with exemplary embodiments of the present invention. Data 302 is input to coder 305. Coder 305 performs conventional coding of data 302 into groups of bits, $b_1, b_2, \ldots b_U$ (FIG. 2), which are then input to interleaver 310. Matrix determiner 340 uses modulation type information 308 indicative of the type of modulation used by modulator 315, and criterion information 335 (described in detail below) to determine matrix dimensions 304, (e.g., R2 and C2, in FIG. 2), and permutation pattern 306 to be input to interleaver 310 for use in creating the interleaver matrix. The bits of the matrix are then read out of interleaver 310, column by column, into modulator 315 for conventional modulation processing (e.g., QPSK, 8-PSK, 16-QAM, 64-QAM). Modulator 315 provides its output to transmit diversity/spreading controller 320 which performs conventional transmit diversity (e.g. OTD or TSTD) operations, and provides outputs to antenna 325 and antenna 330. In CDMA and WCDMA embodiments, the controller 320 can also perform conventional multi-antenna spreading operations. In some embodiments, transmitter 300A can be in a base station, such as base station 105 (FIG. 1). In other embodiments, transmitter 300A can be in a mobile station, such as mobile station 125 (FIG. 1).

Figure 3B:
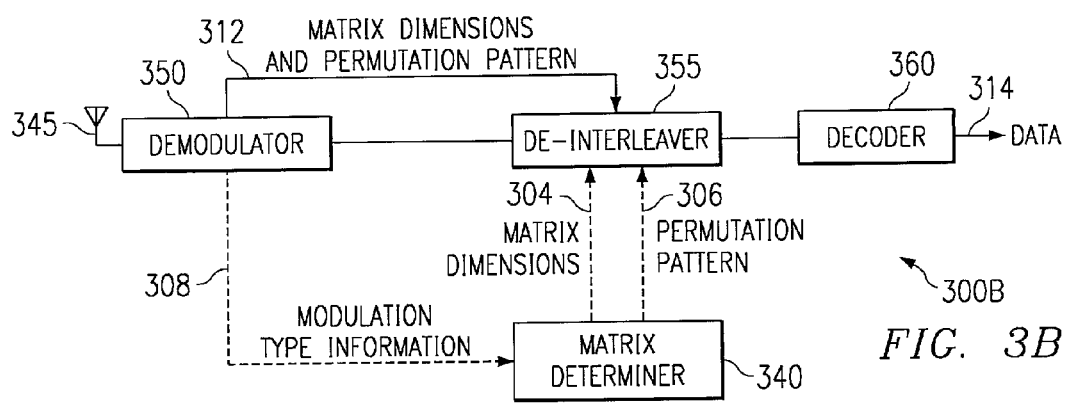
FIG. 3B diagrammatically illustrates a receiver in accordance with an exemplary embodiment of the present invention.

Data transmitted from a transmitter, such as transmitter 300A, can be received by a device such as that shown in FIG. 3B which diagrammatically illustrates a receiver 300B in accordance with an exemplary embodiment of the present invention. Antenna 345 receives input signaling, and demodulator 350 can map the received symbols to soft decisions, where each soft decision can be represented by multiple (e.g., 4 to 8) bits, as is conventional. In a QPSK example, if the received symbol is 0.875+j0.5, then the soft decisions would be 0.875 for the real bit and 0.5 for the imaginary bit. Demodulator 350 also extracts matrix dimensions and permutation pattern 312 (which have already been determined by matrix determiner 340 of FIG. 3A and transmitted in a training sequence) and sends them to de-interleaver 355. De-interleaver 355 is capable of operating on both individual bits and multi-bit soft decisions. The soft decisions created by demodulator 350 are input to de-interleaver 355, which uses the received matrix dimensions and permutation pattern 312 to re-order the soft decisions into the original bit order and sends the re-ordered soft decisions to decoder 360. The de-interleaver is simply another interleaver for "undoing" the interleaving performed at 310 in FIG. 3A, and thus is designed to produce ultimately the matrix shown in FIG. 2. However, in the de-interleaver, the matrix is filled column by column, the columns are permuted, and then the matrix is read out row by row. Also, where soft decisions are used, each of $b_1, b_2, \ldots b_U$ in FIG. 2 represents multiple bits corresponding to a soft decision. Decoder 360 performs conventional decoding processing (e.g., Turbo decoding where soft decision are produced by demodulator 350) and outputs data 314. In CDMA and WCDMA embodiments, the demodulator 350 can also perform conventional despreading operations. In some embodiments, receiver 300B can be in a mobile station, such as mobile station 125 (FIG. 1). In other embodiments, receiver 300B can be in a base station, such as base station 105 (FIG. 1).

In some embodiments, shown by the broken lines in FIG. 3B, receiver 300B can include matrix determiner 340 for determining the matrix dimensions and permutation pattern within receiver 300B.

Figure 4A:
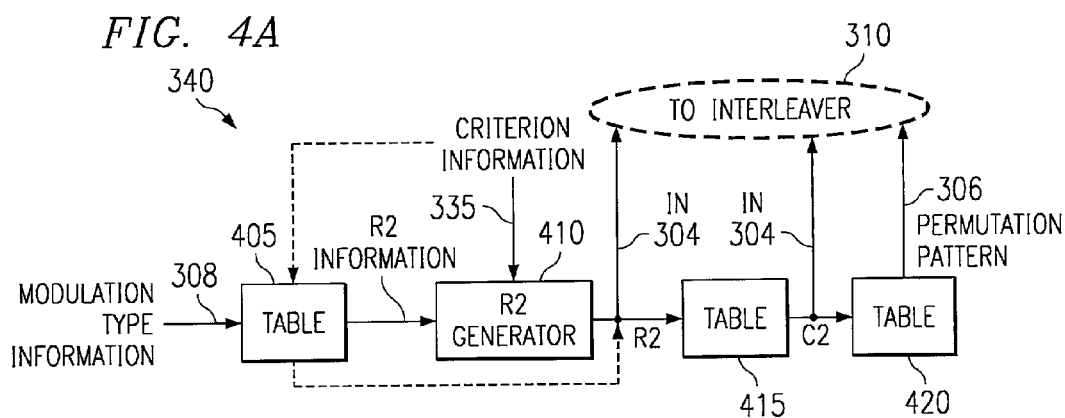
FIG. 4A diagrammatically illustrates a matrix determiner in accordance with an exemplary embodiment of the present invention.
Figure 4B:
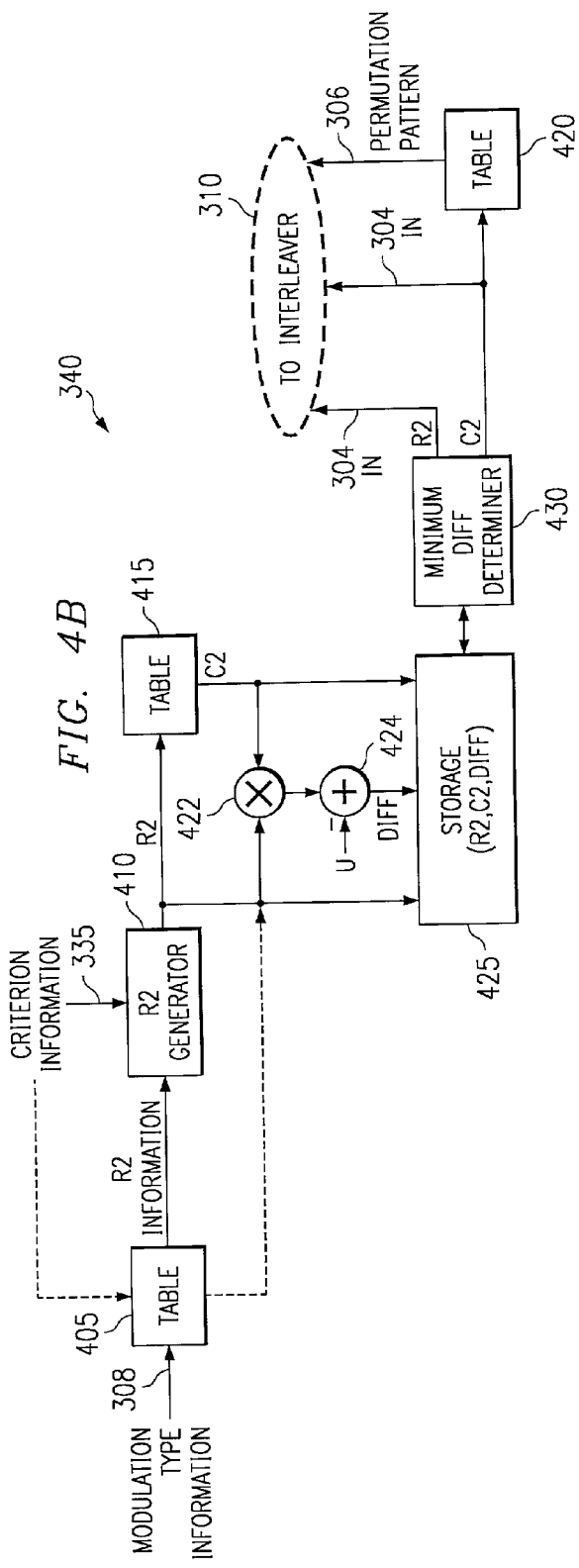
FIG. 4B diagrammatically illustrates a matrix determiner in accordance with an exemplary embodiment of the present invention.

More detailed exemplary embodiments of matrix determiner 340 (FIGS. 3A and 3B) are diagrammatically illustrated in FIGS. 4A and 4B. In the exemplary embodiments shown in FIG. 4A, matrix determiner 340 receives modulation type information 308 and applies it to look-up table 405 to obtain R2 information, such as the R2 value(s) that will, for the given type of modulation, result in an improvement in diversity gains. The R2 information may also indicate values of R2 that should be avoided. Criterion information 335 and the R2 information, are input into R2 generator 410. R2 generator 410 uses criterion information 335 and the R2 information to select R2 for the interleaver matrix. The criterion information can, in some embodiments, specify an acceptable range of values from which R2 can be selected. Matrix determiner 340 can then use R2 to look-up the corresponding C2 value from table 415. C2 can be used to look-up permutation pattern 306 in table 420. R2, C2 (i.e., matrix dimensions 304 in FIGS. 3A and 3B) and permutation pattern 306 are then sent from matrix determiner 340 to interleaver 310.

In some embodiments, shown by the broken lines in FIG. 4A, the R2 selection operation described above can be integrated entirely into a look-up table.

The exemplary embodiments of matrix determiner 340 shown in FIG. 4B can help to avoid using excessive dummy bits when filling the interleaver matrix. Matrix determiner 340 receives modulation type information 308 and applies it to look-up table 405 to obtain R2 information, such as the R2 value(s) that will, for the given type of modulation, result in an improvement in diversity gains. The R2 information may also indicate values of R2 that should be avoided. Criterion information 335 and the R2 information, are input into R2 generator 410. R2 generator 410 uses criterion information 335 and the R2 information to select various possible values of R2 consistent with the R2 information and the criterion information. For example, the R2 information may indicate that there are several possible values of R2, but the criterion information may specify that only the best 50% of those can be chosen. Matrix determiner 340 can then use the values of R2 to look-up the corresponding C2 values from table 415. Each pair of R2 and C2 values can then be multiplied in multiplier 422 and the product sent to subtractor 424 where the number of input bits, U, is deducted from the product of R2 and C2, resulting in a difference value DIFF. Each R2, C2 and associated DIFF value are stored in storage 425. Minimum DIFF determiner 430 reads storage 425 and determines which DIFF value stored therein is the smallest. Minimum DIFF determiner 430 then selects and outputs the R2 and C2 values that correspond to the smallest DIFF value stored in storage 425. C2 can be used to look-up permutation pattern 306 in table 420. R2, C2 (i.e., matrix dimensions 304 in FIGS. 3A and 3B) and permutation pattern 306 are then sent from matrix determiner 340 to interleaver 310.

In some embodiments, shown by the broken lines in FIG. 4B, the above-described R2 selection process of FIG. 4B can be integrated entirely into a look-up table.

Some embodiments of the present invention, such as those diagrammatically illustrated in FIGS. 3A and 4A, can perform the exemplary operations illustrated in the flow chart of FIG. 5A. The present invention receives modulation type information in block 505. It can use the modulation type information at 510 to get R2 information, such as the R2 value(s) that, for a given type of modulation, will result in an improvement in diversity gains. The number of rows, R2 (FIG. 2) can be chosen in block 515 based on R2 information from block 510 and criterion information. The number of columns, C2 (FIG. 2), can be chosen in block 520 based on the R2 selected in block 515. After selecting a permutation pattern in block 525 based on the C2 selected in block 520, the present invention returns to block 505.

Some embodiments of the present invention, such as diagrammatically illustrated in FIGS. 3A and 4B, can perform the exemplary operations illustrated in the flow chart of FIG. 5B. The exemplary operational flow illustrated in FIG. 5B can be used, for example, for multiple determinations of row and column values. Operations in FIG. 5B begin after the R2 information has been obtained at 510 in FIG. 5A. At this point, an integer index n equals 0 in block 530. The number of rows for the $n^{th}$ iteration, R2 (n), can be chosen in block 535 based on R2 information from block 510 (FIG. 5A) and criterion information. The number of columns for the $n^{th}$ iteration, C2(n), can be chosen in block 540 based on the R2(n) selected in block 535. The difference for the $n^{th}$ iteration, DIFF(n), can be calculated in block 545 by multiplying R2(n) with C2(n) and subtracting the number of input bits, U. A check can be made in decision point 550 as to whether or not more calculations should be made. If it is determined in decision point 550 that more calculations should be made, then n can be incremented in block 553 and sent to block 535. If it is determined in decision point 550 that no further calculations should be made, then the minimum DIFF can be determined in block 555 from those calculated in block 545. R2 and C2 associated with the determined minimum DIFF can also be selected in block 555. After selecting a permutation pattern in block 560 based on the C2 selected in block 555, the present invention returns to block 505 (FIG. 5A).

Figure 6:
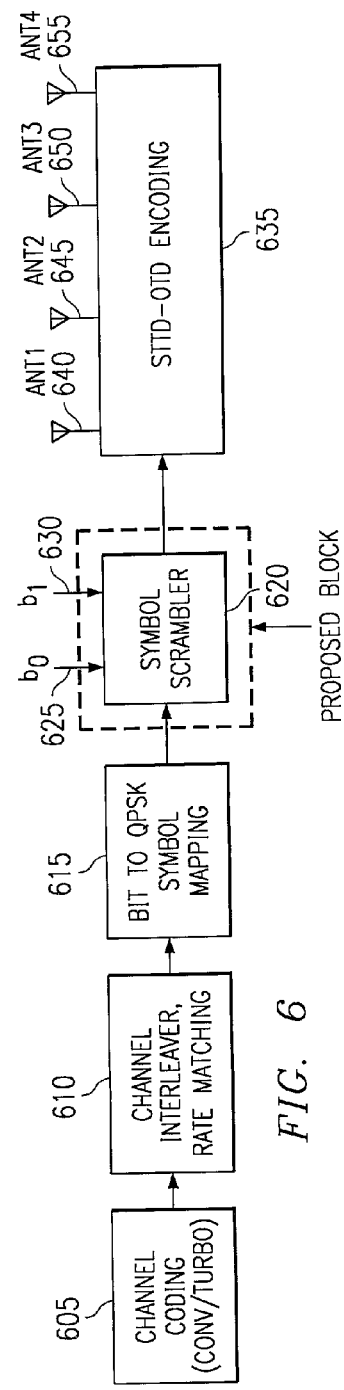
FIG. 6 diagrammatically illustrates a symbol scrambler in accordance with an exemplary embodiment of the present invention.

FIG. 6 diagrammatically illustrates a symbol scrambler in accordance with an exemplary embodiment of the present invention. Data from the channel coding block 605 is interleaved with the channel interleaver 610. A bit to QPSK symbol mapping block 615 produces symbols. Alternative embodiments can include a bit the QAM symbol mapping block. The symbol scrambler 620 takes inputs that determine the permutations produced by the symbol scrambler. These inputs can include bits $b_0$ 625 and $b_1$ 630, which operate on sets of 4 symbols at a time. Alternative embodiments can operate on two symbols at a time when there are only two antennas as when OTD is used. The symbols are encoded with an STTD-OTD encoding block 635, and the symbols are output to 4 antennas 640, 645, 650, 655. Other alternative embodiments include BPSK transmission. In this case the symbols are made of individual bits and the bits coming out of the channel interleaver and rate matching are passed directly to the symbol scrambler.

The STTD-OTD diversity scheme for four transmit antennas is sensitive to the channel interleaver. The STTD-OTD performance can be greatly improved by introducing a very simple scrambling after the channel interleaving. The sensitivity of STTD-OTD to the channel interleaver is because the effective deinterleaved bits at the receiver see a single transmit antenna pair for long sequences. Hence the key to improving the STTD-OTD performance is to prevent this long sequence from using a single diversity antenna pair. This can either be done by changing the channel interleaver structure or by introducing a symbol level scrambling. This does not significantly increase the complexity of the receiver. In order to not change the release'99 channel interleaver, we consider the symbol level scrambling approach to improve the STTD-OTD performance. The STTD-OTD technique for a symbol sequence $S_1$, $S_2$, $S_3$ and $S_4$ is given below.

Antenna 1: $S_1|S_1|S_2|S_2|$
Antenna 2: $-S_2^*|-S_2^*|S_1^*|S_1^*|$
Antenna 3: $S_3|-S_3|S_4|-S_4|$
Antenna 4: $-S_4^*|S_4^*|S_3^*|-S_3^*|$ The symbol level scrambling of FIG. 6 randomizes the fading antenna pattern for STTD-OTD. The four possible ways that were employed to scramble the symbol sequence $S_1$, $S_2$, $S_3$, $S_4$ are given below:

$(b_0, b_1)$
(0, 0): $S_1$, $S_2$, $S_3$, $S_4$
(0, 1): $S_2$, $S_1$, $S_4$, $S_3$
(1, 0): $S_3$, $S_4$, $S_1$, $S_2$
(1, 1): $S_4$, $S_3$, $S_2$, $S_1$

The value of the bits $b_0$, $b_1$ (625 and 630) determines the scrambling of the symbols $S_1$, $S_2$, $S_3$, $S_4$. The bits $b_0$, $b_1$ can be derived from the long code for the base station. This symbol level scrambling is employed before the STTD-OTD encoding is done.

Some embodiments of the present invention can be used in multiple antenna systems which combine OTD and/or TSTD with another diversity technique, such as space time transmit diversity ("STTD") or space time spreading ("STS"). In this case, the bits in each row can be distributed in substantially even numbers over all the transmit antennas. Some embodiments of the present invention can apply to the STTD-OTD proposal in high speed downlink packet access ("HSDPA") of the 3$^{rd}$ Generation Partnership Project ("3Gpp") and the STS-OTD proposal in 1x-EVDV (Evolution Data and Voice) of 3Gpp2. In addition, some embodiments of the present invention can also be relevant to transmit diversity schemes with other convolutional-based concatenated coding techniques, such as turbo codes.

It will be evident to workers in the art that the exemplary embodiments of the present invention can be readily implemented by suitable modifications in software, hardware or a combination of software and hardware in conventional communication transmitters and receivers, for example CDMA/WCDMA transmitters and receivers.

Although exemplary embodiments of the present invention have been described in detail, it will be understood by those skilled in the art that various modifications can be made therein without departing from the spirit and scope of the invention as set forth in the appended claims.

What is claimed is:

1. An interleaving apparatus for use in wireless communications, comprising:
    an interleaver, coupled to an input, for forming a bit output matrix from a group of bits received at said input, said interleaver for outputting the bits of said group in a temporal order determined by said bit output matrix;
    a second input coupled to said interleaver for receiving matrix dimensions that are based on a modulation used for communication of information represented by said group of bits;
    said interleaver for forming said bit output matrix in response to said matrix dimensions; and
    a matrix determiner having an input for receiving information indicative of said modulation, said matrix determiner responsive to said modulation information for determining said matrix dimensions for said bit output matrix, said matrix determiner coupled to said second input for providing said matrix dimensions to said interleaver.

2. The apparatus of claim 1, wherein said modulation includes phase shift keying.

3. The apparatus of claim 2, wherein said modulation includes quadrature phase shift keying.

4. The apparatus of claim 1, wherein said modulation includes quadrature amplitude modulation.

5. The apparatus of claim 1, wherein said matrix determiner is further for providing a permutation pattern to said interleaver in response to one of said matrix dimensions, said interleaver for forming said bit output matrix in response to said permutation pattern.

6. The apparatus of claim 1, wherein said matrix dimensions include a row dimension and a column dimension.

7. The apparatus of claim 6, wherein said matrix determiner is operable for providing said row dimension as a product of an odd integer and a number of bits-per-symbol associated with said modulation.

8. The apparatus of claim 6, wherein said matrix determiner includes a row dimension source for providing said row dimension in response to said modulation information, and a column dimension source coupled to said row dimension source for providing said column dimension in response to said row dimension.

9. The apparatus of claim 8, wherein said matrix determiner includes a permutation pattern source coupled to said column dimension source and responsive to said column dimension for providing a permutation pattern to said interleaver, said interleaver for forming said bit output matrix in response to said permutation pattern.

10. The apparatus of claim 8, wherein said row dimension source includes a look-up table and wherein said column dimension source includes a look-up table.

11. The apparatus of claim 8, including a multiplier coupled to said row dimension source and said column dimension source for multiplying said row dimension by said column dimension to produce a product.

12. The apparatus of claim 11, including a subtractor coupled to said multiplier for subtracting a predetermined number from said product to produce a difference.

13. The apparatus of claim 12, wherein said predetermined number is a total number of bits in said group of bits.

14. The apparatus of claim 13, wherein said row dimension source is operable for providing a plurality of row dimensions in response to said modulation information, said column dimension source operable for providing a plurality of column dimensions respectively in response to said plurality of row dimensions, said multiplier for multiplying each said row dimension by its corresponding column dimension to produce a plurality of products, said subtractor for subtracting said total number of bits from each of said products to produce a plurality of differences, and including a minimum difference determiner coupled to said subtractor for determining a smallest one of said differences and defining said matrix dimensions to be the row and column dimensions that correspond to said smallest difference.

15. The apparatus of claim 1, wherein said group of bits is a coded group of bits.

16. The apparatus of claim 1, wherein each position of said bit output matrix contains only a single bit of said group.

17. The apparatus of claim 1 wherein each position of said bit output matrix contains multiple bits of said group.

18. A wireless communication apparatus, comprising:
an input for receiving a group of bits to be interleaved;
an interleaver coupled to said input for forming a bit output matrix from the group of bits, said interleaver for outputting the bits of said group in a temporal order determined by said bit output matrix;
a modulation apparatus coupled to said interleaver for performing one of a modulation operation and a corresponding demodulation operation on the group of bits;
an antenna structure coupled to said modulation apparatus for communication of information produced by said modulation operation;
a second input coupled to said interleaver for receiving matrix dimensions that are based on said modulation operation; and
said interleaver for forming said bit output matrix in response to said matrix dimensions.

19. The apparatus of claim 18, including a matrix determiner having an input for receiving information indicative of said modulation operation, said matrix determiner responsive to said modulation information for determining matrix dimensions for said bit output matrix, said matrix determiner coupled to said interleaver for providing said matrix dimensions to said interleaver.

20. The apparatus of claim 18, wherein said antenna structure includes a plurality of antennae, wherein said modulation apparatus is a modulator for performing said modulation operation, and including a transmit diversity apparatus connected between said modulator and said plurality of transmit antennae for applying transmit diversity to a result of said modulation operation.

21. The apparatus of claim 20, wherein said transmit diversity includes one of OTD and TSTD.

22. The apparatus of claim 18, provided as one of a CDMA apparatus and a WCDMA apparatus.

23. The apparatus of claim 18, wherein said group of bits is a coded group of bits.

24. The apparatus of claim 18 provided as a transmitter apparatus.

25. The apparatus of claim 24 provided as a fixed site base station.

26. The apparatus of claim 24 provided as a mobile communication station.

27. The apparatus of claim 18 provided as a receiver apparatus.

28. The apparatus of claim 27 provided as a fixed site base station.

29. The apparatus of claim 27 provided as a mobile communication station.

30. An interleaving method for wireless communications, comprising:
receiving a group of bits to be interleaved;
forming a bit output matrix from the group of bits, and outputting the bits of said group in a temporal order determined by said bit output matrix;
determining matrix dimensions for said bit output matrix in response to information indicative of modulation used for communication of information represented by said group of bits;
receiving information indicative of said modulation for determining said matrix dimensions for said bit output matrix; and
said forming step including forming said bit output matrix in response to said matrix dimensions.

31. The method of claim 30, wherein said matrix dimensions include a row dimension and a column dimension.

32. The method of claim 31, wherein said determining step includes providing a plurality of row dimensions in response to said modulation information, providing a plurality of column dimensions respectively in response to said row dimensions, multiplying each said row dimension by its corresponding column dimension to produce a plurality of products, subtracting from each of said products a total number of bits in said group of bits to produce a plurality of differences, determining a smallest one of said differences, and defining said matrix dimensions to be the row and column dimensions that correspond to said smallest difference.

33. An interleaving method for wireless communications, comprising:
receiving a group of bits to be interleaved;
forming a bit output matrix from the group of bits, and outputting the bits of said group in a temporal order determined by said bit output matrix;
determining matrix dimensions for said bit output matrix in response to information indicative of modulation used for communication of information represented by said group of bits and providing said row dimension as a product of an odd integer and a number of bits-per-symbol associated with said modulation, and providing a plurality of row dimensions in response to said modulation information, providing a plurality of column dimensions respectively in response to said row dimensions, multiplying each said row dimension by its corresponding column dimension to produce a plurality of products, subtracting from each of said products a total number of bits in said group of bits to produce a plurality of differences, determining a smallest one of said differences, and defining said matrix dimensions to be the row and column dimensions that correspond to said smallest difference; and said forming step including forming said bit output matrix in response to said matrix dimensions.

34. The method of claim 33, including providing a permutation pattern in response to one of said matrix dimensions, said forming step including forming said bit output matrix in response to said permutation pattern.

35. The method of claim 33, wherein said modulation includes one of phase shift keying and quadrature amplitude modulation.

36. A wireless communication apparatus, comprising:

an input for receiving a group of bits to be interleaved;

an interleaver coupled to said input for forming a bit output matrix from the group of bits, said interleaver for outputting the bits of said group in a temporal order determined by said bit output matrix;

a modulation apparatus coupled to said interleaver for performing an operation on the group of bits;

an antenna structure coupled to said modulation apparatus for communication of information produced by said modulation operation;

a second input coupled to said interleaver for receiving matrix dimensions that are based on said modulation operation; and said interleaver for forming said bit output matrix in response to said matrix dimensions.

* * * * *